April 17, 1928.
A. ALDRICH ET AL
STEAM FITTING
Filed Aug. 7, 1925
1,666,637
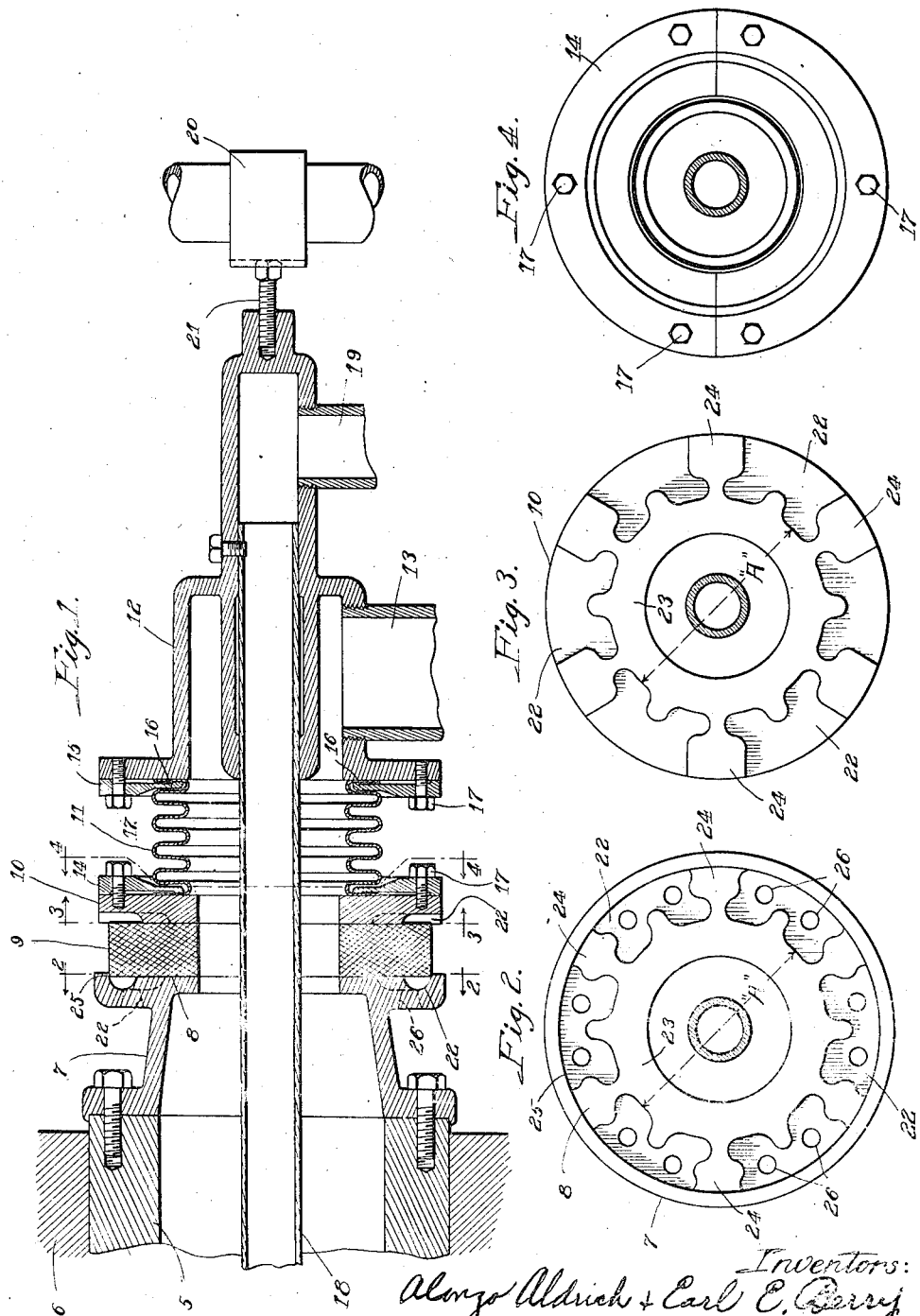
Inventors:
Alonzo Aldrich & Earl E. Berry
By Wilson & McCanna
Attys.

Patented Apr. 17, 1928.

1,666,637

UNITED STATES PATENT OFFICE.

ALONZO ALDRICH AND EARL E. BERRY, OF BELOIT, WISCONSIN, ASSIGNORS TO BELOIT IRON WORKS, OF BELOIT, WISCONSIN, A CORPORATION OF WISCONSIN.

STEAM FITTING.

Application filed August 7, 1925. Serial No. 48,751.

This invention is an improvement on balanced steam fittings of the kind disclosed in our applications Serial Nos. 751,942 and 751,943. These steam fittings, especially designed for application to the journals of steam heated drier cylinders for paper drying machines and the like, are characterized by a steam supply conduit having a fitting with a hollow rotary journal end and means responsive to or acted on by the steam pressure within the conduit for maintaining a steam tight joint regardless of fluctuations in the steam pressure and without imposing undue friction under the varying conditions described in said applications. In the preferred embodiment we employ a packing or bearing ring in the joint between the rotary journal and the terminal part of the fitting and also employ means such, for example, as a flexible bellows acted on by the steam pressure for keeping the bearing surfaces in contact with the packing ring. Under certain conditions, however, the condensate or steam from the cylinder accumulates in the inside of the fitting and when this takes place there is a small seepage of water between the joints or bearing surfaces that come in contact with the sides of the packing ring. When this takes place a filament of water forms over the entire bearing surfaces and the steam pressure blows through this filament, thus blowing off the fitting which, of course, is objectionable.

The purpose of the present invention is to prevent the steam fitting from blowing off under these conditions and to this end we have devised a simple and effective means for accomplishing the desired result, which will be presently more fully described.

Referring to the drawings—

Figure 1, is a vertical longitudinal section through a steam fitting embodying our invention; and Figs. 2, 3 and 4, are cross-sections taken on the lines 2—2, 3—3 and 4—4 respectively of Fig. 1.

Inasmuch as the application of steam fittings to drying cylinders is well known in this art we have deemed it necessary to show in the drawing only those parts of the steam supply conduit which connect with the end of a rotary cylinder journal and which are usually termed the steam fitting. As shown in Fig. 1 the hollow journal 5 of the drier cylinder or the like rotates in and is supported by a bearing 6. A neck 7 bolted to the end of the journal has a bearing surface 8 against which a bearing or packing ring 9 is pressed by the action of the steam pressure in the fitting or steam supply conduit, or by other means. This conduit in the present illustration comprises said bearing ring 9, an annular plate 10, a flexible, axially expansible bellows 11, a housing 12, and a steam supply pipe 13. The flexible bellows is suitably secured at its ends to the plate 10 and housing 12, preferably by clamping rings 14 and 15 split diametrically as shown in Fig. 4 and having reduced inner portions 16 adapted to be inserted into the outside corrugations at the end of the bellows for clamping the ends thereof against the plate 10 and housing 12 by tightening the bolts 17.

Provision is made for removing condensate from the drying cylinder, consisting, in this instance, of a condensate siphon comprising a pipe 18 which extends centrally through the housing 12 and bearing parts and into the cylinder to the bottom thereof, and a depending outlet pipe 19, the use of this siphon being well known in this art.

The steam pressure within the supply line and cylinder acts to force the steam fitting away from the journal tending to separate the bearing joints. This action is opposed by a suitable stationary member 20 and an adjustable means such as a screw 21 interposed between said member 20 and the housing 12. By proper adjustment of the screw 21 the flexible bellows 11 may be put under sufficient pressure and tension to hold the bearing parts of the joint in contact but without imposing such pressure on said bearing parts as to cause undue friction. With this organization of parts the steam pressure in the supply line will act against the plate 10 and the corrugation of the flexible bellows adjacent to said plate and exert a force which presses said plate against the bearing ring 9 and the latter against the bearing surface 8. The parts are so proportioned that this pressure will not be excessive but instead will insure steam tight joints with minimum friction, under all conditions.

By making at least one of the faces of the bearing ring 9 flat and perpendicular to the axis of rotation of the journal, we provide for slight shifting and displacement of the fitting in a vertical plane as is frequently caused by elongation and contraction of the pipes 13 and 19. The bearing ring 9 is preferably composed either in whole or in part of carbon and graphite as claimed in application Serial No. 719,011 filed June 9, 1924.

Under certain conditions it is possible for condensate to accumulate in the inside of the fitting and when this takes place there seems to be a small seepage of water between the joints or bearing surfaces that come in contact with each side of the ring 9. When this takes place a filament of water forms over the entire surface of each side of the carbon ring 9, this being especially true if said ring has worn to such an extent that it bears against the metal surfaces of the parts 7 and 10 over its entire area of both sides. When the steam is turned on the pressure acts equally in all directions on this filament of water and causes the plate 10 to be pushed back and the steam to escape. It is this blowing off of the fitting that our invention is designed to prevent. This we have accomplished by recessing or relieving the bearing surface 8 and the plate 10 as denoted by 22 in Figs. 1, 2 and 3. These recessed or depressed areas are spaced circumferentially about the bearing surfaces that come in contact with the sides of the carbon ring 9 and are so shaped as to leave an annular bearing surface 23 at the center and intermediate bearing surfaces 24 extending to the outer edge of the carbon ring. This leaves a central annular continuous bearing surface and a peripheral interrupted bearing surface in contact with each side of the carbon ring. The diameter of said continuous annular bearing surface, indicated by "A", is less than the outside diameter of the flexible bellows. Said area is, therefore, less than the effective area of the flexible bellows acted on by the steam pressure. As a result of this construction the steam pressure can never apply against a bearing surface area greater than the effective area of the flexible bellows. This being the case the force due to the steam pressure acting on the flexible bellows is always greater than any force that can be exerted on the water filament, with the result that the joint formed on each side of the carbon ring is always kept tight and prevents escape of steam or water. Furthermore the intermediate bearing surfaces 24 enable the full width of the carbon ring to be utilized for bearing purpose. In the present case the carbon ring is held from displacement by an annular shoulder 25 on the rotating part 7, and openings 26 are provided leading from the recessed portions for relief of any accumulated pressure therein.

It should be expressly understood that the term "steam" as used in the claims means any fluid, and that the invention defined by the claims may be applied with such other fluids.

It is believed that the foregoing conveys a clear understanding of the objects prefaced above and while we have illustrated but a single working embodiment as applied to the particular fitting shown, it should be understood that changes might be made in the application to different fittings without departing from the spirit and scope of the invention as expressed in the appended claims, in which—

We claim:

1. In combination, a hollow rotary element having a bearing surface at one end, a non-rotary conduit adapted to deliver steam into said element, said conduit having a bearing surface opposed to said rotary bearing surface, a bearing ring interposed between said bearing surfaces, the bearing end of said conduit providing a transverse surface acted on by the steam to maintain said bearing surfaces in fluid tight contact with the bearing ring, and depressed areas in said bearing surfaces leaving each with an inner annular bearing surface of less area than the effective area of said transverse surface acted on by the steam to maintain fluid tight joints between said ring and bearing surfaces.

2. In combination, a hollow rotary element having a bearing surface at one end, a non-rotary conduit adapted to deliver steam into said element, said conduit having a bearing surface opposed to said rotary bearing surface, a bearing ring interposed between said bearing surfaces, the bearing end of said conduit having a transverse annular surface acted on by the steam to maintain said bearing surfaces in fluid tight contact with the bearing ring, and depressed areas in the peripheral portion of said bearing surfaces leaving in each an inner annular bearing surface the diameter of which is less than the largest effective diameter of the said transverse annular surface acted on by the steam against said bearing end of the conduit.

3. In combination, a hollow rotary element, a non-rotary conduit, a bearing ring interposed between the rotary element and conduit adapted to have fluid tight contact therewith and serving to connect the conduit and the rotary element, the conduit including a flexible bellows allowing its bearing end to move in any direction, said bellows providing a transverse annular surface acted on by the steam in the conduit to maintain fluid tight joints between the bearing surfaces of the bearing ring, rotary element, and the conduit, and relief areas in the bearing surfaces leaving each with an inner annular bearing surface the diameter of which is less than the greatest effective diameter of said transverse annular surface of the bellows acted on by the steam in the conduit to maintain said fluid tight joints.

ALONZO ALDRICH.
EARL E. BERRY.